United States Patent
Lacroix

(10) Patent No.: US 6,840,548 B2
(45) Date of Patent: Jan. 11, 2005

(54) QUICK CONNECTION FOR THE REMOVABLE JOIN OF PIPES

(75) Inventor: Jean-Jacques Lacroix, Lovagny (FR)

(73) Assignee: Staubli Faverges, Faverges (FR)

( * ) Notice: Subject to any disclaimer, the term of this patent is extended or adjusted under 35 U.S.C. 154(b) by 87 days.

(21) Appl. No.: 10/356,617

(22) Filed: Feb. 3, 2003

(65) Prior Publication Data

US 2003/0146623 A1 Aug. 7, 2003

(30) Foreign Application Priority Data

Feb. 4, 2002 (FR) .......................................... 02 01283

(51) Int. Cl.⁷ ............................................... F16L 37/00
(52) U.S. Cl. ....................... 285/308; 285/317; 285/924; 251/149.6
(58) Field of Search ........................... 285/1, 306, 308, 285/317, 900, 924; 251/149.6

(56) References Cited

U.S. PATENT DOCUMENTS

| | | | | |
|---|---|---|---|---|
| 2,595,211 A | * | 4/1952 | Le Clair | 137/512.3 |
| 3,777,771 A | * | 12/1973 | De Visscher | 137/1 |
| 4,311,328 A | * | 1/1982 | Truchet | 285/308 |
| 4,366,945 A | * | 1/1983 | Blauenstein | 251/149.6 |
| 4,394,039 A | * | 7/1983 | Burquier | 285/85 |
| 4,483,510 A | | 11/1984 | Palau et al. | |
| 4,576,359 A | * | 3/1986 | Oetiker | 251/149.6 |
| 4,703,598 A | * | 11/1987 | Wilson et al. | 52/238.1 |
| 4,753,268 A | * | 6/1988 | Palau | 137/595 |
| 5,002,254 A | * | 3/1991 | Belisaire et al. | 251/149.9 |
| 5,123,840 A | * | 6/1992 | Nates | 433/95 |
| 5,135,264 A | * | 8/1992 | Elliott-Moore | 285/2 |
| 5,310,161 A | * | 5/1994 | Bryce | 251/149.6 |
| 5,346,177 A | * | 9/1994 | Paulsen et al. | 251/149.6 |
| 5,535,985 A | * | 7/1996 | Larbuisson | 251/149.9 |
| 5,630,570 A | * | 5/1997 | Lacroix et al. | 251/149.9 |
| 5,806,832 A | * | 9/1998 | Larbuisson | 251/149.6 |

FOREIGN PATENT DOCUMENTS

| | | | |
|---|---|---|---|
| FR | 1503989 | 12/1967 | |
| FR | 2514855 | 4/1983 | |
| JP | 2-225898 | * 9/1990 | .................. 285/317 |

* cited by examiner

Primary Examiner—James M. Hewitt
(74) Attorney, Agent, or Firm—Dowell & Dowell, P.C.

(57) ABSTRACT

A quick connect coupling for joining two pipes which includes a male and a female element adapted to fit axially in each other. A body of the female element is equipped with a resiliently urged bolt mounted to slide in the body and provided with a central opening for receiving the male element. A wall of the opening is equipped with three teeth offset with respect to one another along a median axis of the opening. The male element is provided with a shoulder adapted to rest selectively against one of the teeth. When the male element rests against an intermediate tooth, a the downstream pipe is placed in communication with ambient atmosphere.

8 Claims, 2 Drawing Sheets

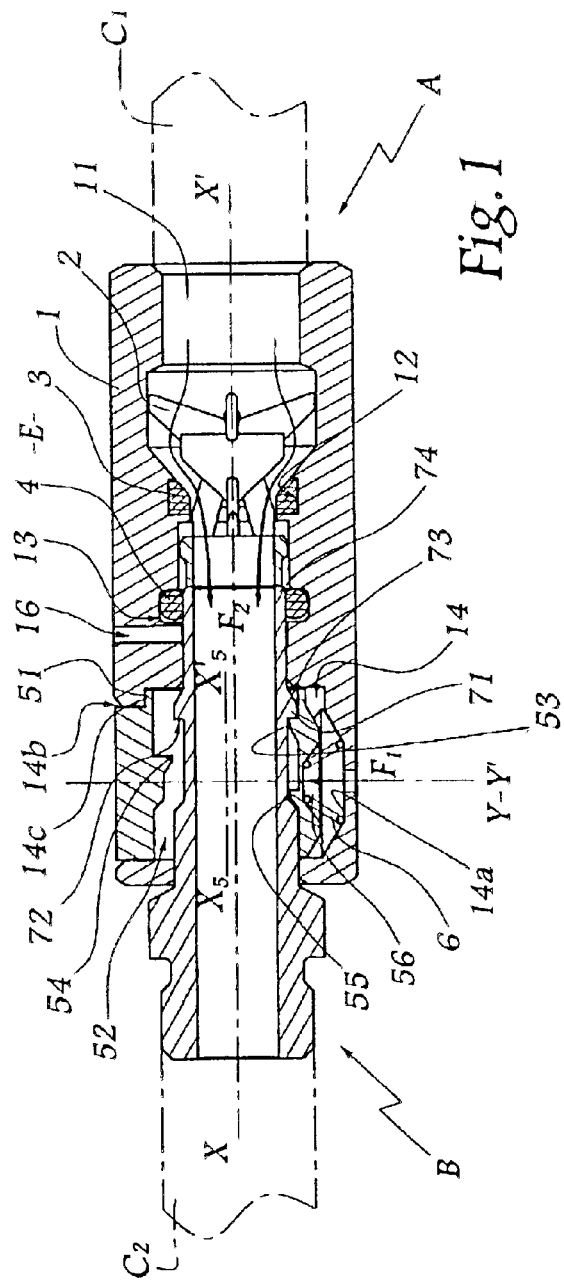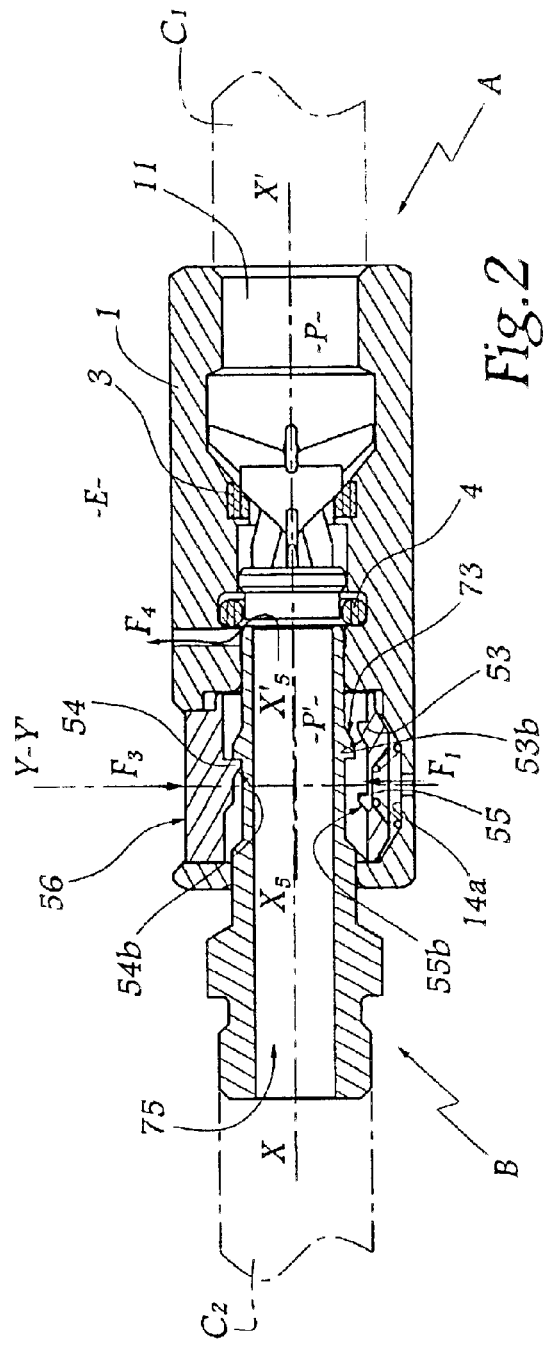

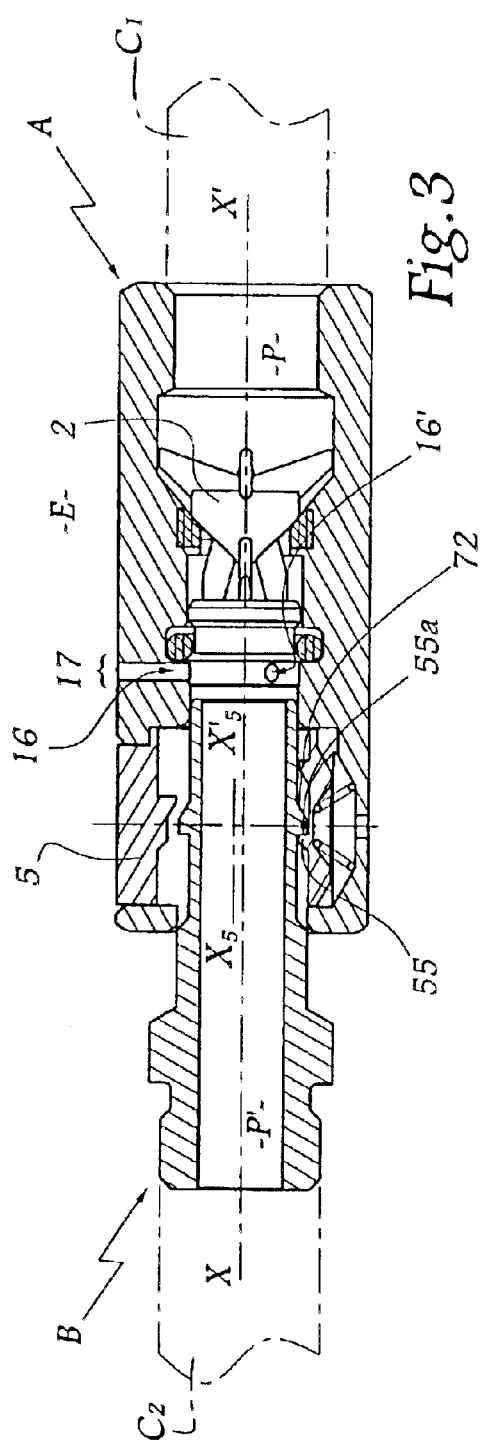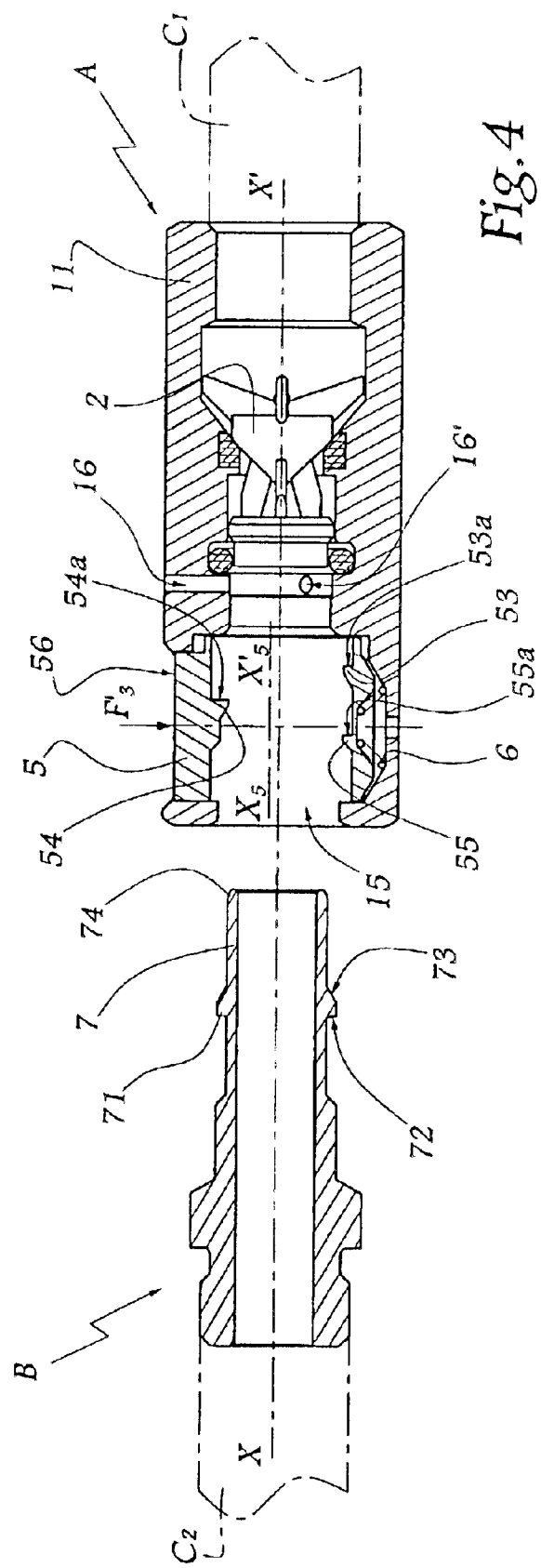

QUICK CONNECTION FOR THE REMOVABLE JOIN OF PIPES

BACKGROUND OF THE INVENTION

1. Field of the Invention

The present invention relates to a quick connection for removably joining two pipes through which a pressurized fluid passes.

2. Description of the Related Art

Patent FR 2 514 855 discloses a quick connection which comprises two elements, male and female, adapted to fit axially, provoking the opening of a valve mounted in the body of the female element, this body being equipped with a loaded bolt, mounted to slide in this body and pierced with a central opening for the fit of the male element. The wall of the opening of the bolt presents three teeth offset with respect to one another along a median axis of this opening, while the male element is provided with a shoulder adapted to rest selectively against one of these teeth. The movement of unlocking of this known connection takes place in two steps corresponding respectively to the abutment of the shoulder of the male element on the intermediate tooth and on the tooth nearest to the opening of the female element. When the male element rests by its shoulder against the tooth nearest the opening, the air contained in the conduit connected to the male element may be driven to the outside without too great a risk of tear of the male element or of a whipping movement of the pipe associated therewith.

This conventional arrangement is satisfactory from the standpoint of robustness and of reliability.

However, when the male element is in abutment by its shoulder against the intermediate tooth, it exerts thereon an effort which depends on the pressure of the fluid present in the pipe connected to the male element. This effort induces frictions which oppose the slide of the bolt in the body of the female element. In order to overcome these efforts of friction, it is necessary to use a powerful spring which elastically loads the lock towards a position of disengagement of the intermediate tooth. This may prove a hindrance during the coupling of the connection as the effort generated by this spring must be overcome in order to allow the introduction of the male element in the female element.

In other words, a connection of the afore-mentioned type becomes difficult to make when it is used with a fluid at relatively high pressure. Now, such a connection must be able to be used for fluid networks at 6 or 10 bars, and even 25 bars, in which case it is effectively difficult to accomplish manually.

In practice, the geometry of the male connector element, which is standardized, should not be modified.

It is an object of the present invention to propose a quick connection which may be easily manipulated, including when the pressure of the fluid is relatively high, and which comprises a standard male connector.

SUMMARY OF THE INVENTION

To that end, the invention relates to a connection of the afore-mentioned type which comprises means for placing the downstream pipe in communication with the ambient atmosphere when the male element rests by its shoulder against the intermediate tooth.

Thanks to the invention, the downstream pipe may be drained of the fluid that it contains, while the male connector is in abutment on the intermediate tooth, with the result that, when this draining operation is terminated, the pressure prevailing in the downstream pipe is substantially equal to the ambient pressure and the shoulder does not exert a considerable effort on the intermediate tooth, this allowing the bolt to be easily moved.

According to advantageous but non-obligatory aspects of the invention, this connection incorporates one or more of the following characteristics:

- The afore-mentioned communicating means comprise at least one orifice formed in the body of the female element, downstream of the valve. This orifice may advantageously be obturated by the male element when the latter rests by its shoulder against the tooth most remote from the opening of a central conduit of the female element. In other words, this orifice is closed when the connection is in passing configuration. In addition, this orifice may be provided to extend in a direction which is substantially radial with respect to the axis of fit of the male and female elements.
- The communicating means are arranged in a zone of the body of the female element distinct from the part in which the bolt slides. Thanks to this aspect of the invention, the fluid coming from the downstream pipe does not risk disturbing slide of the bolt.
- The communicating means are arranged upstream of that part of the body of the female element in which the bolt slides.
- The female element is equipped with means adapted to ensure seal of the connection between the male and female elements, while, when it rests against the intermediate tooth, the male connector is disengaged with respect to the sealing means. In this way, the sealing means do not oppose the drain of the downstream pipe.

BRIEF DESCRIPTION OF THE DRAWINGS

The invention will be more readily understood on reading the following description of an embodiment of a quick connection in accordance with its principle, given solely by way of example and made with reference to the accompanying drawings, in which:

FIG. 1 is an axial section of a quick connection according to the present invention, the male and female elements being shown in passing and locked position.

FIG. 2 is a section similar to FIG. 1 during a first step of opening of the connection.

FIG. 3 is a section similar to FIG. 1 during a second step of opening of the connection, and FIG. 4 is a section similar to FIG. 1 when the male and female elements are uncoupled.

DESCRIPTION OF PREFERRED EMBODIMENT

Referring now to the drawings, the connection shown in FIGS. 1 to 4 comprises a female element A and a male element or connector B connected respectively to an upstream pipe $C_1$ and to a downstream pipe $C_2$. The upstream pipe $C_1$ is itself connected to a source of fluid under pressure (not shown).

The body 1 of the female element has a substantially cylindrical and circular outer shape, centered on an axis X-X' which is also the longitudinal axis of a conduit 11, inside the body 1, and in which is disposed a valve 2 mobile along axis X-X'. The body 1 is also equipped with a seal 3 forming a seat for the valve and disposed inside a groove 12 made in the wall of the conduit 11.

The body 1 forms a second groove 13 for receiving an O-ring 4.

The body 1 is also provided with a cylindrical housing 14 extending substantially in the direction of an axis Y-Y' perpendicular to axis X-X'.

Inside the housing 14 there is slidably mounted a bolt 5 on which a spring 6 exerts an elastic effort $F_1$ directed opposite the bottom 14a of the housing 14, i.e. in the direction of its opening 14b. The movement of the bolt 5 under the effort $F_1$ is limited by a projection 51 coming into abutment against a shoulder 14c of the housing 14.

The spring 6 is truncated in shape and engages in a reinforcement 56 provided on the outer surface of the bolt 5.

The bolt 5 is provided with a central opening 52 centered on an axis $X_5$–$X'_5$ parallel to axis X-X'. The opening 52 is bordered by three teeth formed on the bolt.

A first tooth 53 forms a surface 53a substantially perpendicular to axis $X_5$-$X'_5$.

A second tooth 54 is made on the side of the bolt 5 opposite spring 6. It defines a surface 54a substantially perpendicular to axis $X_5$-$X'_5$.

A third tooth 55 is arranged on the side of the bolt 5 nearest the spring 6 and forms a surface 55a substantially perpendicular to axis $X_5$-$X'_5$.

The teeth 53, 54 and 55 extend from the circumference of the opening 52 in the direction of axis $X_5$-$X'_5$. The tooth 53 is the most remote from the opening 15 of the conduit 11, while tooth 55 is the closest to this opening, tooth 54 being intermediary between teeth 53 and 55.

A bore 16 connects the conduit 11, downstream of the valve 2, with the outer atmosphere E. In practice, and as is visible in FIGS. 3 and 4, a plurality of bores of the type such as bore 16 may be distributed about axis X-X', one of these other bores appearing with reference 16'. In the example shown, the body 1 is provided with three bores 16' distributed at 120° about axis X-X'.

The male connector B comprises a metallic body 7 provided with a flange 71 forming a shoulder 72 intended to come selectively into abutment against one of the teeth 53, 54 or 55.

The flange 71 is also provided with an inclined ramp 73 which is truncated and convergent in the direction of the front end 74 of the body 7.

Functioning is as follows:

When element B is fitted in element A, the functioning is similar to that of the known connection of FR 2 514 855.

This makes it possible to attain the position of FIG. 1 where the flow of the fluid is represented by arrows $F_2$. In this position, the connector B is in contact with the O-ring 4, which avoids leakages towards the outside of the connection.

In the configuration of FIG. 1, the body 7 obturates the bores 16 and 16'.

From this position, and when it is desired to uncouple elements A and B, it suffices to exert on the bolt 5 an effort $F_3$ opposite effort $F_1$, which has the effect of causing the bolt 5 to slide in the housing 14 in the direction of the bottom 14a, this making it possible to disengage the teeth 53 with respect to the flange 71. Due to this displacement, the tooth 54 is placed on the path of disengagement of the shoulder 72 which then comes into abutment against the surface 54a. In this position shown in FIG. 2, the front end 74 of the body 7 is disengaged with respect to the valve 2 and to the O-ring 4, while the bore 16 is in communication with the inner volume 75 of the body 7, this allowing a flow of the fluid from the downstream pipe $C_2$ towards the outside E, as represented by arrow $F_4$. The fluid located in the upstream pipe $C_1$ remains upstream of the valve 2 which is in firm abutment against its seat 3 under the effect of the pressure P prevailing in the upstream part of the conduit 11.

Thanks to the flow $F_4$, the pressure P' in the volume 75 decreases rapidly, with the result that the effort of friction between the shoulder 72 and the surface 54a decreases rapidly. When this effort of pressure attains a lower threshold value, this effort is overcome by the effort $F_1$ and the spring 6 pushes the bolt 5 towards the position of FIG. 3 where the connector 7 is efficiently retained in position thanks to the cooperation of the surface 55a and of the shoulder 72.

As the effort of friction between the surfaces 72 and 54a is relatively low, the effort $F_1$ which must be exerted by the spring 6 in order to return the bolt 5 towards the position of FIG. 3 is not too great, even if the original pressure P is relatively high. In effect, this effort $F_1$ is independent of this pressure, as it occurs after the drain of the pipe through bores 16 and 16'.

The stiffness constant of the spring 6 may thus be chosen with a relatively low value. In this way, the user does not perceive too great a resistance to the effort $F_3$ which he must exert.

The male element B may then be definitively released by a fresh pressing on the bolt 5, as represented by arrow $F'_3$ in FIG. 4, this pressing having the effect of retracting the tooth 55 with respect to the flange 71. The connector B may in that case be withdrawn as represented by arrow $F_5$.

The invention makes it possible to effect draining of the downstream pipe on the intermediate tooth and, in this way, to limit the effort to be overcome in order to pass from the position of FIG. 2 to that of FIG. 3, i.e. to limit the stiffness constant of the spring 6. This stiffness constant being less than in the known devices, the effort $F_3$ or $F'_3$ to be exerted in order to drive the bolt 5 in the housing 14, may be lower.

The fact that the bores 16 and 16' are located in a zone 17 of the body 1 distinct from the housing 14 avoids the essential of the flow $F_4$ propagating towards the interior of the housing 14 and tending to push the bolt 5 against the effort $F_3$, which might cause the user instinctively to increase the pressure that he exerts with his finger on the outer surface 56 of the bolt or button 5, and cause a complete unlocking of the connection before total drain of the downstream pipe $C_2$.

The invention therefore ensures that the pipe $C_2$ is efficiently drained before the male element B is withdrawn from the female element A.

What is claimed is:

1. A quick connect coupling for removably joining two pipes through which a pressurized fluid passes, the coupling comprising, a male element and a female element adapted to fit axially in each other, a body of the female element being equipped with a resiliently urged bolt mounted to slide in said body in a direction transversely with respect to a longitudinal axis of a fit of said male and female elements, said bolt having a central opening for receiving said male element, an inner wall defining the opening of said bolt having three teeth offset with respect to one another along a median axis of said opening, said male element including a shoulder adapted to rest selectively against one of said teeth, a valve mounted within said female element and movable with respect to a valve seat mounted upstream of said central opening of said bolt, a first of said teeth being positioned more closely adjacent said valve than a second intermediate tooth and a third tooth, said male element and said female element being in open flow communication when said shoulder of said male element rests against said first tooth, and communication means downstream of said valve seat but spaced from said bolt for placing a downstream pipe in communication with ambient atmosphere when said male element is moved so as to rest by its shoulder against said intermediate tooth upon force being applied to urge said bolt toward said longitudinal axis when said shoulder rests against said first tooth, so as to thereby relieve pressure from the downstream pipe.

2. The quick connect coupling according to claim 1, wherein said communication means comprise at least one orifice formed in said body of said female element, downstream of said valve.

3. The quick connect coupling according to claim 2, wherein said at least one orifice is adapted to be obturated by said male element when said male element rests by its shoulder against said first tooth.

4. The quick connect coupling according to claim 2, wherein said at least one orifice extends in a direction substantially radial with respect to the longitudinal axis of the fit of said male and female elements.

5. The quick connect coupling according to claim 1, wherein said communication means are disposed in a zone of said body of said female element distinct from a portion in which said bolt slides.

6. The quick connect coupling according to claim 1, wherein said communication means are disposed upstream of a portion of said body of said female element in which said bolt slides.

7. The quick connect coupling according to claim 1, wherein said female element is equipped with sealing means adapted to ensure a seal between male and female elements when said first tooth is in engagement with said shoulder of said male element and wherein when said male element rests by its shoulder against said intermediate tooth, it is disengaged with respect to said sealing means.

8. A quick connect coupling for removably joining two pipes through which a pressurized fluid passes, the coupling comprising a male element and female element adapted to fit axially in each other along a longitudinal axis, a body of the female element being equipped with a resiliently urged bolt mounted to slide in said body in a direction transversely with respect to the longitudinal axis, said bolt having a central opening for receiving said male element, an inner wall defining the opening of said bolt having three teeth offset with respect to one another along a median axis of said opening, said male element including a shoulder adapted to rest selectively against one of said teeth, a valve mounted within said female element and movable with respect to a valve seat mounted upstream of said central opening of said bolt, a first of said teeth being positioned more closely adjacent said valve than a second intermediate tooth and a third tooth, said male element and said female element being in open flow communication when said shoulder of said male element rests against said first tooth, and communication means downstream of said valve seat but spaced from said bolt for placing a downstream pipe in communication with ambient atmosphere when said male element is moved so as to rest by its shoulder against said intermediate tooth upon force being applied to urge said bolt toward said longitudinal axis when said shoulder rests against said first tooth so as to relieve pressure from the downstream pipe until a pressure within said central opening is such as to cause said bolt to be resiliently moved radially with respect to the longitudinal axis to thereby cause said shoulder to disengage said intermediate tooth and subsequently engage said third tooth and permit complete decompression of the downstream pipe.

* * * * *